Dec. 16, 1958 R. F. SCHNELLER ET AL 2,864,378
PROTECTORS FOR TUBING
Filed Dec. 3, 1954

Rudy F. Schneller,
Owen L. Bandy,
Inventors
Koenig and Pope,
Attorneys.

United States Patent Office 2,864,378
Patented Dec. 16, 1958

2,864,378

PROTECTORS FOR TUBING

Rudy F. Schneller, O'Fallon, and Owen L. Bandy, St. Louis, Mo., assignors to The McNeil Machine & Engineering Company, Akron, Ohio, a corporation of Ohio Application December 3, 1954, Serial No. 472,885

4 Claims. (Cl. 138—61)

This invention relates to protectors for tubing, and more particularly to a protector for the end portion of a length of plastic tubing leading into a tube connector.

Among the several objects of the invention may be noted the provision of an easily installed protector of the class described for protecting the end portion of the tubing against bending and shear stresses such as are commonly encountered; the provision of a protector of this class which is also adapted to grip the end of a length of tubular sheathing such as is often used on the tubing and to hold it in position for added protection; and the provision of a protector such as described which is economical to manufacture. Other objects and features will be in part apparent and in part pointed out hereinafter.

The invention accordingly comprises the constructions hereinafter described, the scope of the invention being indicated in the following claims.

In the accompanying drawings, in which several of various possible embodiments of the invention are illustrated, Fig. 1 is a view partly in elevation and partly in section showing a protector of this invention as applied to the end portion of a length of plastic tubing leading into a tube connector, and showing the end portion of a length of tubular sheathing gripped by the protector;

Corresponding reference characters indicate corresponding parts throughout the several views of the drawings.

Figure 1:
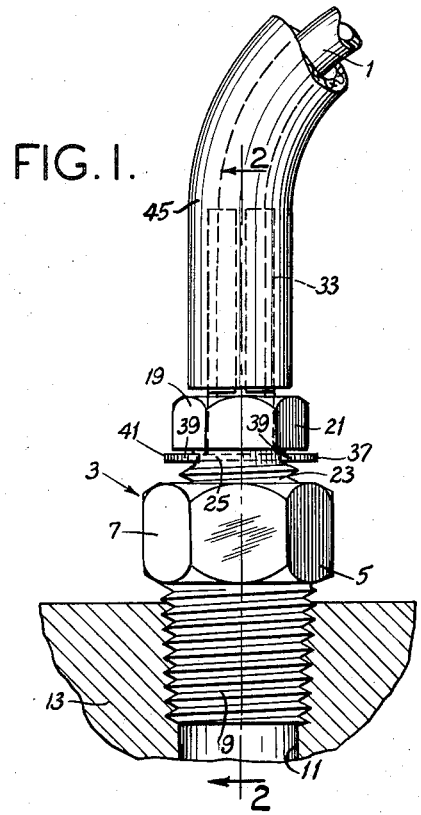

Referring to the drawings, there is indicated at 1 a length of plastic tubing such as is commonly used for lubricant in force-feed lubrication systems. The end portion of the tubing 1 is shown as received in a conventional tube connector generally designated 3. The tube connector is shown as comprising a tubular screw member 5 having a hexagonal head 7 and an externally threaded shank 9. The latter is shown as threaded in a passage 11 in a body 13. The screw member 5 has a threaded socket 15 in its head end, the socket having a conical bottom 17. A tubular compression nut 19 is threaded in the socket 15. The nut has a hexagonal head 21 and an externally threaded shank 23, with an annular groove 25 at the root of the shank. The end of the shank is tapered as indicated at 27. The end portion of the tubing 1 extends through the nut 19 into the screw member 5. The end of the tubing engages a shoulder 29 in the screw member 5. The nut is threaded in the socket 15 far enough to effect such inward deformation of the tapered end 27 of the shank of the nut by the wedging action of the tapered end against the conical bottom 17 of the socket 15 as to lock the tubing in the nut with a lubricant-tight seal.

The portion of the tubing leading into the tube connector 3 is apt to be subjected to bending and shear stresses in the plane of the outer face of the head 21 of the nut 19. At 31 is indicated a protector of this invention for protecting the tubing against breakage such as otherwise might result from such bending and shear stresses. The protector 31 is made from a sheet metal blank having a rectangular portion which is formed into an elongate cylindrical stem or sleeve 33 having a length greater than its width for receiving the tubing 1 with a tight fit. The sheet metal blank also has a portion which is bent to provide an integral arm 34 extending laterally outward from one end of the sleeve, an integral finger 35 extending forward from the outer end of the arm portion 34 and offset laterally outward from the sleeve, and a C-shaped clip portion 37 at the outer end of the finger which is bent into a plane generally at right angles to the axis of the sleeve with the opening of the C aligned with the axis of the sleeve.

The C-shaped clip member 37 is spaced from the adjacent end of the sleeve 33 a distance slightly greater than the height of the head 21 of the compression nut 19. The finger 35 is offset laterally outward from the axis of the sleeve a distance somewhat greater than the maximum radius of the head 21. The width of the finger 35 is made to correspond to the length of one of the six flat sides of the head 21. The C-shaped clip member 37 is dimensioned for being sprung on the shank 23 of the nut 19 within the annular groove 25, the spacing of the tips 39 of the C being slightly less than the diameter of shank 23 in the groove 25. The sides 41 of the C are sufficiently resilient to allow them to yield laterally outward enough to be clipped on the shank.

The sleeve 33 is formed with outstruck pointed teeth 43, the points of the teeth being directed toward the clip end of the sleeve. These teeth are provided for the purpose of biting into and gripping a length of flexible protector tubular fabric sheathing 45, such as is conventionally used for protecting plastic tubing, to hold the end of the sheathing closely adjacent the outer face of the head 21 of the compression nut 19. The inside diameter of the sheathing is slightly greater than the outside diameter of the sleeve 33.

Figure 2:
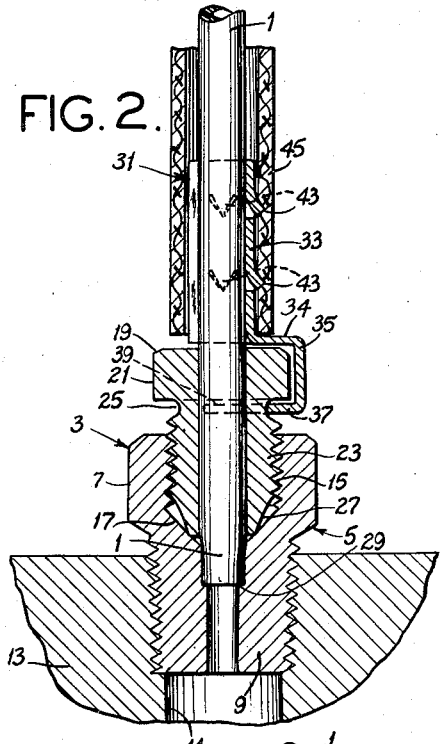
Fig. 2 is a cross section taken on line 2—2 of Fig. 1.
Figure 3:
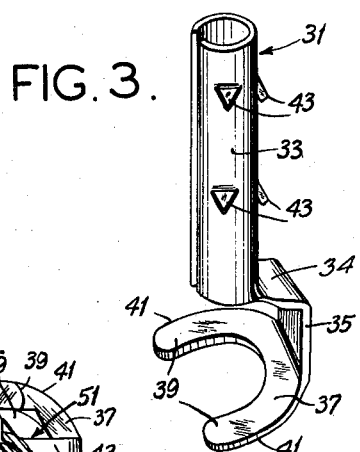
Fig. 3 is a view in perspective of the protector per se.

Usually, the screw member 5 is pre-threaded in the passage 11 in the body 13 and the compression nut 19 is loosely threaded in the socket 15 in the screw member 5. To make the tubing connection, the protector 31 is first applied by clipping it on the shank of the nut 19 in the groove 25 as shown in Figs. 1 and 2. Then the end portion of the plastic tubing protruding from the sheathing 45 is inserted in the outer end of the sleeve 33 of the protector and pushed through the sleeve and the compression nut to the point where its end engages the shoulder 29. The compression nut is tightened. The sheathing 45 is slipped forward on the tubing and its end portion telescoped on the sleeve 33, to complete the connection.

As will be apparent from Fig. 2, the sleeve 33, clipped to the compression nut 19, provides reinforcement for the portion of the tubing 1 extending through the sleeve into the nut to protect it against sharp bending and serve shear stresses such as might otherwise result in breaking of the tubing at the critical point where it enters the nut 19. The teeth 43 keep the end of the sheathing 45 from slipping away from the nut 19 and the sheathing is thereby maintained in position, providing added reinforcement for the tubing against bending and shear stresses.

Figure 4:
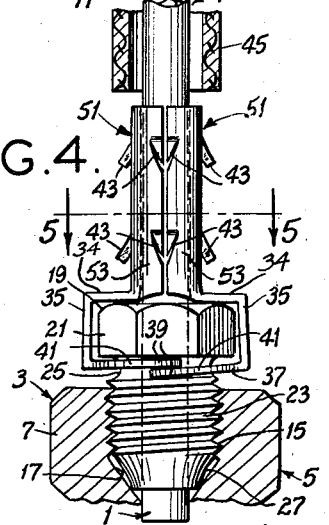
Fig. 4 is a view similar to Fig. 2 showing a modification.
Figure 5:
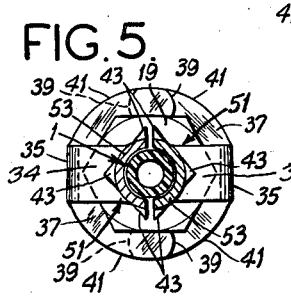
Fig. 5 is a cross section taken on line 5—5 of Fig. 4.

The protector 31 has to be applied to the nut 19 before the plastic tubing 1 is entered in the nut. Figs. 4 and 5 illustrate a modified version of the protector enabling application of the protector to the nut 19 after the plastic tubing has been entered in the nut. In this case, two protector members each designated by the reference character 51 are used. The members 51 are like the protector 31 except that instead of having a sleeve of full cylindrical cross section corresponding to the sleeve 33 of protector 31, they have a sleeve portion 53 of generally half-cylindrical cross section. Otherwise, each member 51 is identical to member 31. The two members 51 are clipped to the nut 19 from opposite sides of the nut, with their half-sleeve portions 53 forming a full cylindrical sleeve surounding the tubing. Fig. 4 shows the sheathing 45 slipped back to enable application of the members 51 to the tubing. It will be understood that the sheathing is subsequently slipped downward on the tubing and telescoped on the two half-sleeves 53.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. A protector for the end portion of a length of plastic tubing leading into a tube connector, said tube connector being of a type comprising a member having a threaded socket and a tubular nut threaded in the socket, the nut having a shank and a head on the outer end of the shank, said protector being made of sheet metal and having an elongate stem portion of at least part-circular cross section for receiving an end portion of the tubing, an integral arm portion extending laterally outwardly from one end of said stem portion, an integral finger extending forward from the outer end of the arm portion and offset laterally outward from the stem portion, said finger being shorter than said stem portion and its length being slightly greater than the height of the head of the nut, and another portion in the form of a C-shaped clip member at the outer end of the finger in a plane generally at right angles to the axis of the stem portion and with the opening of the C aligned with the axis of the stem portion, the clip member being adapted for clipping on the shank of the nut under the head of the nut, with the arm portion overlying the head of the nut and the stem portion extending out from the head of the nut for protecting the tubing against bending and shear stresses.

2. A protector as set forth in claim 1 wherein the elongate stem portion has outwardly projecting struck-out pointed teeth, the points of the teeth being directed toward the clip member, for biting into a protective tubular sheathing for the tubing telescoped on the stem portion.

3. A protector as set forth in claim 1 wherein the stem portion is of substantially full circular cross section.

4. A protector as set forth in claim 1 wherein the stem portion is of substantially half circular cross section.

References Cited in the file of this patent

UNITED STATES PATENTS

| | | |
|---|---|---|
| 1,191,888 | Glauber | July 18, 1916 |
| 1,310,627 | McEvilly | July 22, 1919 |
| 1,351,368 | Burns | Aug. 31, 1920 |
| 1,816,008 | Folds | July 8, 1931 |
| 1,819,243 | Hubbard | Aug. 18, 1931 |
| 1,847,218 | Lamb | Mar. 1, 1932 |
| 1,874,334 | Nero | Aug. 30, 1932 |
| 1,971,500 | Palmer | Aug. 28, 1934 |
| 2,379,179 | Petersen | June 26, 1945 |
| 2,472,986 | Reder | June 14, 1949 |
| 2,530,258 | Marsan | Nov. 14, 1950 |
| 2,599,303 | Ward | June 3, 1952 |

FOREIGN PATENTS

| | | |
|---|---|---|
| 3,844 | Great Britain | Mar. 10, 1915 |
| 454,991 | Great Britain | Oct. 12, 1936 |
| 450,217 | Italy | July 27, 1943 |